Sept. 14, 1926.

V. A. FYNN 1,599,758

SYNCHRONOUS MOTOR

Filed March 24, 1924    2 Sheets-Sheet 1

INVENTOR.
VALÈRE ALFRED FYNN.
Attorney.

Sept. 14, 1926.
V. A. FYNN
1,599,758

SYNCHRONOUS MOTOR

Filed March 24, 1924   2 Sheets-Sheet 2

Inventor:
VALÈRE ALFRED FYNN.
By John F. Bruninga
Attorney.

Patented Sept. 14, 1926.

1,599,758

UNITED STATES PATENT OFFICE.

VALÈRE ALFRED FYNN, OF ST. LOUIS, MISSOURI.

SYNCHRONOUS MOTOR.

Application filed March 24, 1924. Serial No. 701,461.

My invention relates particularly to synchronous induction motors of the self or the separately excited type. In some of its aspects it is applicable to single as well as to polyphase motors and it also relates to apparatus associated with dynamo electric machines.

The objects and features of this invention will appear from the detail description taken in connection with the accompanying drawings and will be pointed out in the claims.

Figure 2:
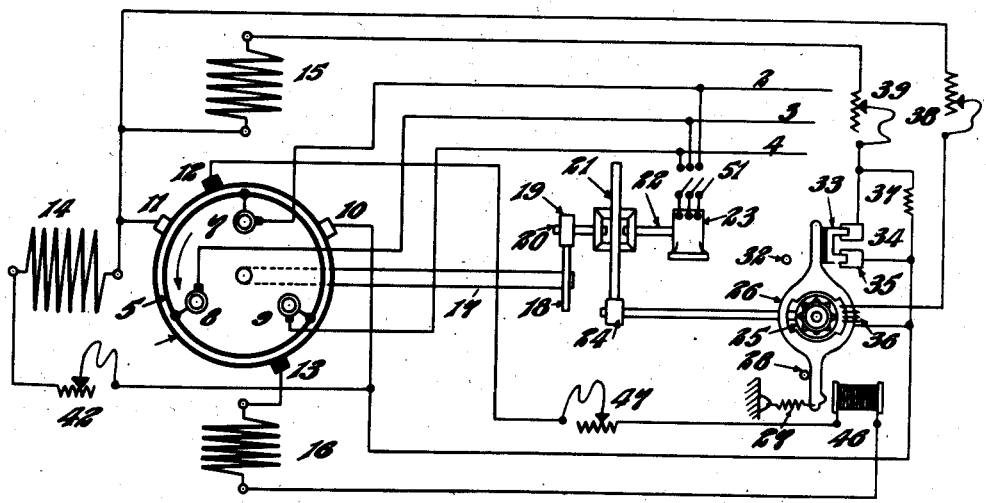
Figure 3:
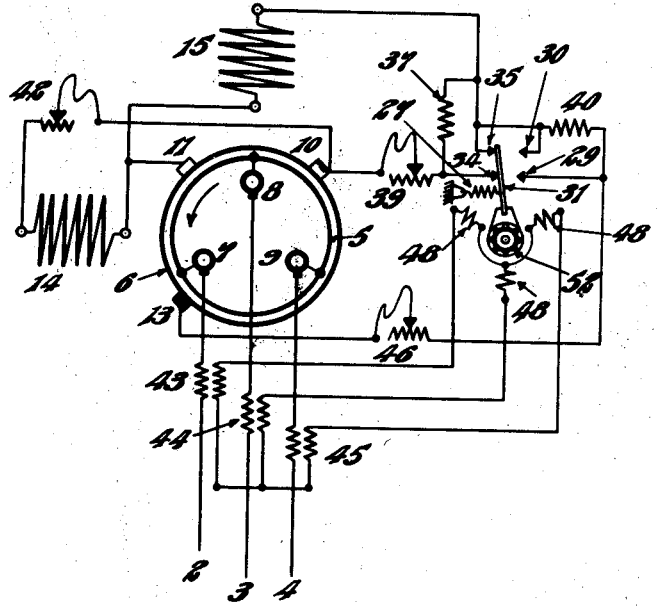
Figures 4, 5:
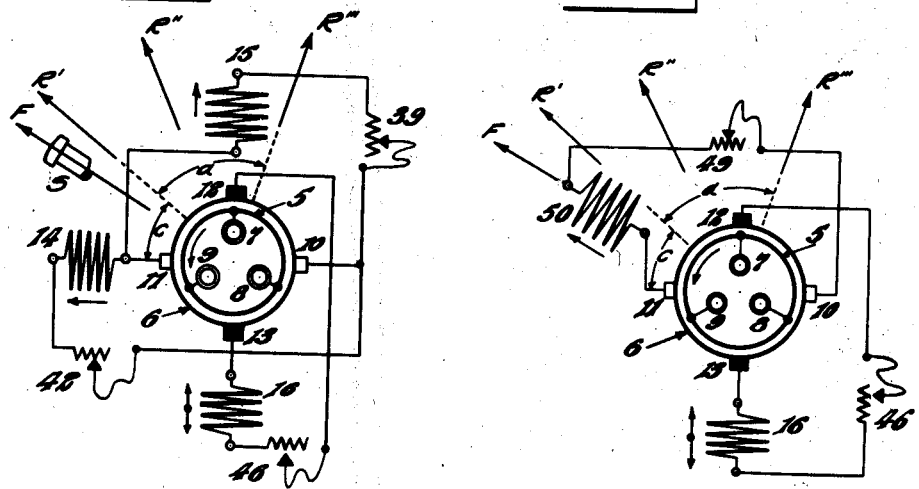

In the accompanying diagrammatic drawings of self-excited two pole machines, Figs. 1, 2, 3 are different embodiments of the invention and Figs. 4 and 5 are explanatory diagrams.

Figure 1:
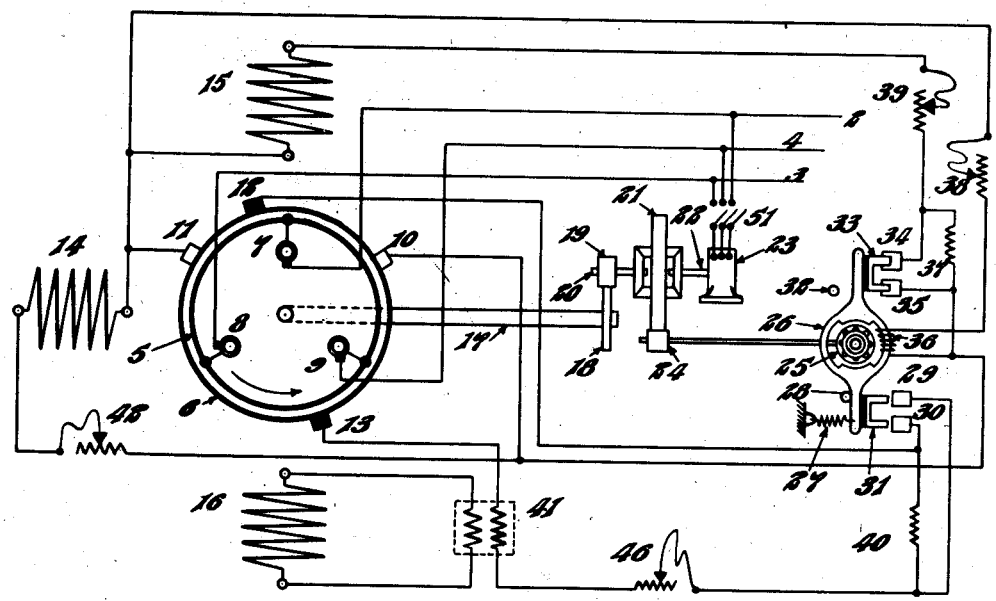

Referring to Fig. 1, the synchronous induction motor there shown has a revolving primary and a stationary secondary. The rotor carries a primary three phase winding 5 adapted to be connected to the supply 2, 3, 4 by means of the sliprings 7, 8, 9 and co-operating brushes. It also carries a commuted winding 6, the commutator of which is not shown, it being assumed that the brushes 10, 11 and 12, 13 co-operating with this winding rest directly on same, thus eliminating all uncertainties as to brush position which are apt to be introduced when the connections between the commutator and the commuted winding must be taken into account. The secondary, here the stator, carries two coaxial windings 15, 16 and a third winding 14 displaced by 90 electrical degrees from the coaxial ones. The brushes 10, 11 are located in the axis of the winding 14 and connected to same through the adjustable resistance 42. These brushes are also connected to the secondary winding 15 through the resistance 37 and the adjustable resistance 39, the brushes 12, 13 are somewhat displaced from the axis of 15 in the direction of rotation of the primary and are connected to the primary of the transformer 41 through the adjustable resistance 46 and the resistance 40. The secondary of the transformer 41 is connected to the secondary winding 16. It is seen that the voltage from the brushes 10, 11 is conveyed conductively to the windings 14, 15, whereas the voltage from the brushes 12, 13 is conveyed to the winding 16 inductively by means of the transformer 41.

A switch or relay 25, 26 normally under the control of the spring 27 is adapted to control or modify or reorganize the circuits of the brushes 10, 11 and 12, 13 or of the windings 15 and 16. On the shaft 17 of the main motor is a gear 18 engaging with the gear 19 mounted on the shaft 20 and driving one side of a differential gear, the other side of which is driven by the shaft 22 coupled to the auxiliary synchronous motor 23 connected to the supply 2, 3, 4 through the switch 51. The middle element of the differential carries a gear wheel 21 engaging with the gear wheel 24 and driving the member 25 of the switch or relay. This member is of magnetic material, laminated or not, and carries a short-circuited winding in the form of a squirrel cage. The other member 26 is adapted to oscillate about 25 between the stops 28, 32 and carries an exciting winding 36 connected to the brushes 10, 11 through the adjustable resistance 38. One arm of the switch member 26 insulatingly carries the contact 33 adapted to co-operate with the stationary contacts 34, 35 and when bridging these contacts it shortcircuits the resistance 37 or closes the circuit of the winding 15 if said resistance is not used. Similarly, another arm of the switch member 26 insulatingly carries the contact 31 adapted to co-operate with the stationary contacts 29, 30 and when bridging these contacts to shortcircuit the resistance 40 or to close the circuit of the brushes 12, 13 when said resistance is not used. When the circuit of the brushes 12, 13 is closed the winding 16 is capable of being energized by the winding 6. The stationary contacts 34, 35 and 29, 30 can advantageously be so positioned with respect to the movable bridges 33, 31 that in some intermediate position of the movable member 26 of the relay the contacts 34, 35 are bridged simultaneously with the contacts 29, 30.

It is preferred to so select the number of turns of the winding 14 and the resistance of the circuit comprising this winding that the ampereturns it produces with the commutator brush voltage available when the motor operates at full load is in excess of the ampereturns produced by the armature or primary reaction of the motor at that time. It is further preferred that the number of turns of the windings 14 and 15 and the resistances of the circuits comprising said windings be so chosen that the ampereturns produced by the winding 14 are always in excess of the ampereturns produced by the winding 15. In order to secure a commercially acceptable weight efficiency it is necessary to make the full load of one of these synchronous induction motors at least equal to the full load of the corresponding slipring induction motor. This can readily be secured with the arrangement here described and when speaking of the full load it is the full load of the corresponding slipring motor which is meant where weight efficiency is a consideration.

The gear ratio between the motor shaft 17 and the shaft 20 of the differential gear is so chosen that when the main motor runs synchronously the shaft 20 is driven at the synchronous speed of the auxiliary motor 23 coupled to the shaft 22 or more generally that this shaft 20 is driven at the same speed as the shaft 22. Furthermore, shafts 20 and 22 must be driven in opposite directions. With this arrangement the middle element of the differential will be stationary when the main and auxiliary motors run synchronously, and will revolve counterclockwise, as seen from main motor end, when the speed of the main motor is less and clockwise when it is greater than the synchronous. The gear ratio between the middle element of the differential and the rotor 25 of the relay is preferably so chosen that when the revolving member of the main motor slips through 360 electrical degrees the rotor 25 makes more than one complete revolution irrespective of the number of poles of the relay itself.

The transformer 41 is preferably designed to be highly effective at very low frequencies such as the ordinary slip frequencies of asynchronous motors.

It is to be noted that the brushes 10, 11 span less than 180 electrical degrees while brushes 12, 13 span a full pole pitch. The result of this arrangement is that the maximum voltage available from the winding 6 is sometimes available at the brushes 12, 13 but never at the brushes 10, 11.

Turning to Fig. 2, this differs from Fig. 1 in that both commutator brush voltages are conductively impressed on the corresponding secondary motor windings. Thus the voltage at the brushes 10, 11 is conductively impressed on the windings 14 and 15 which are displaced by 90 electrical degrees from each other and the voltage at the brushes 12, 13 which are displaced from 10, 11 is conductively impressed on the winding 16 which is coaxial with 15. One arm of the relay 25, 26 designed to modify or reorganize the motor circuits is adapted to shortcircuit the resistance 37 in circuit with 15 or to close and open this circuit if 37 is omitted. The other arm is adapted to change the resistance in the circuit of 16 by more or less compressing the adjustable carbon pile resistance 46 in the circuit of this winding. The resistance 47 is an additional adjustable resistance in the circuit of the winding 16.

In Fig. 3 the primary is on the rotor and comprises the three-phase winding 5 adapted to be connected to the supply 2, 3, 4 by means of the slip rings 7, 8, 9 and co-operating brushes. The rotor also carries the commuted winding 6 which here, like in all the other figures, does duty as the source of synchronizing and exciting voltage. The brushes 10, 11 and 11, 13 co-operate with this winding, or the commutator which would be used in practice and connected to 6, they are displaced by 90 electrical degrees and the axis of the brushes 10, 11 is at right angles to the axis of the brushes 11, 13. The stator, here the secondary, carries two windings 14, 15 displaced by 90 electrical degrees. The winding 14 is coaxial with the brushes 10, 11, the winding 15 with the brushes 11, 13. The winding 14 is permanently connected to the brushes 10, 11 through the adjustable resistance 42. The winding 15 is connected to the brushes 10, 11 through the adjustable resistance 39 and the resistance 37 and it is also connected to the brushes 11, 13 through the adjustable resistance 46 and the resistance 40. The contact blade 31 of the relay 48, 52 is adapted to shortcircuit the resistance 37 or the resistance 40, or to connect the winding 15 either to the brushes 10, 11 or to the brushes 11, 13 when the resistances 37 and 40 are omitted. Normally this motor circuit modifying or reorganizing relay is under the control of the spring 27, rests on the contacts 34, 35 and shortcircuits 37 or connects the winding 15 to the brushes 10, 11. The three phase winding 48 on the stationary member of this relay is connected to the series transformers 43, 44, 45, the primaries of which are included in the connections between the sliprings of the motor and the supply. The movable member is in the form of a squirrel cage rotor and carries the contact blade 31. When sufficiently energized the relay interconnects the contacts 29, 30 and thus shortcircuits 40 instead of 37 or connects 15 to the brushes 11, 13 instead of to the brushes 10, 11.

In Fig. 4 the rotor carries the primary winding 5 adapted to be connected to the supply by means of sliprings, and also a commuted winding 6, with which co-operate the brushes 10, 11 and 12, 13 displaced by 90 electrical degrees. The stator, here the secondary, carries two coaxial windings 15, 16 and a winding 14 displaced by 90 electrical degrees with respect to the coaxial windings. The brushes 10, 11 are coaxial with the displaced winding and connected to it through the adjustable resistance 42. These brushes are also connected to the winding 15 through the adjustable resistance 39. The brushes 12, 13 are coaxial with 16 and connected to it through the adjustable resistance 46, but in Fig. 4 this circuit is shown open at this adjustable resistance. The arrow F and the pole S indicate the direction and location of the unidirectional magnetization produced by 14 and 15. The arrows R′, R″, R‴ indicate possible positions of the resultant motor magnetization at different loads and synchronous speed.

In Fig. 5 the windings 14 and 15 of Fig. 4 have been combined into a single winding 50 controlled by the adjustable resistance 49 and capable of producing a magnetization of same magnitude and direction as that produced by the resultant of the two magnetizations produced by 14 and 15 respectively. This is a permissible simplification, useful in some cases but not possessed of all of the properties of the arrangement shown in Fig. 4. In other respects Figs. 4 and 5 are identical.

The mode of operation of these improved machines is somewhat as follows: Referring to Fig. 1, let it be supposed that the motor shaft 17 is disconnected from the gear 18 and therefore from the differential gear and the member 26 of the relay is locked in a position in which 33 bridges the contacts 34, 35 and 31 bridges the contacts 29, 30. This is equivalent to not making use of the differential gear or of the relay. The circuit of the relay winding 36 would then naturally be interrupted at 38 and the auxiliary motor 23 would be disconnected from the supply 2, 3, 4.

The machine may be started by connecting the sliprings 7, 8, 9 to the full supply voltage or a fraction thereof and the resistances 39, 42 and 46 set to produce the desired starting or accelerating torque. The machine will start like an asynchronous induction motor, the revolving field produced in the primary by the polyphase currents supplied to it from the mains generating phase displaced voltages in the windings 14, 15, 16 and giving rise to corresponding secondary induction motor torque producing currents in the usual way. The currents in the winding 15 close through the adjustable resistance 39 and the brushes 10, 11, those in the winding 14 through the adjustable resistance 42 and the same brushes and those in 16 close through the transformer 41 which inductively transfers corresponding currents to the circuit comprising the brushes 12, 13 and the adjustable resistance 46. The resistances 40, 37 are not considered because supposed to be shortcircuited by the bridges 31, 33. To increase the torque of the machine the resistances 39, 42, 46 are diminished in one or more steps until a value is reached which permits the induction motor torque to bring the speed of the machine very close to the synchronous. At this point, and as previously explained by me, the commutator brush voltages, the amplitude or magnitude of which is quite independent of the speed of the revolving element of the motor, take a more and more pronounced control of the circuits comprising the windings 14, 15, 16 for the reason that as synchronism is approached the voltages generated in said windings diminish whereas the commutator brush voltages, when derived from a source such as the frequency converter embodied in the motor of Fig. 1 and used there as an exciter for the machine, increase rather than diminish as the speed rises. These commutator brush voltages, which I will also refer to as auxiliary voltages, cause corresponding currents to flow in the windings 14, 15, 16 and these currents, cooperating with the primary revolving field, produce torques which can be utilized to synchronize the motor. Also as heretofore explained by me, when the auxiliary voltage, which at sub-synchronous speeds is an alternating voltage when, for instance, derived from a suitably driven frequency converter used as an exciter, is near synchronism of same phase as the voltage which is generated by the primary revolving field in the secondary motor winding on which said auxiliary voltage is being impressed, then, and regardless of whether the auxiliary voltage is derived from an exciter integral with the motor or separate therefrom, the torque developed by the current resulting in said winding from the application of said auxiliary voltage is positive, strictly unidirectional and pulsating. Such a torque is eminently well suited for positively synchronizing such a motor with little or no disturbance to the line. When a plurality of secondary and displaced motor windings are subjected near synchronism to correspondingly phase displaced auxiliary voltages of proper phase, whether derived from an exciter integral with the motor as in Fig. 1 or separate therefrom, the resulting torque is composed of a plurality of phase displaced unidirectional and pulsating torques and can be made continuous and if desired practically constant by suitably spacing the component torques and suitably selecting their individual amplitudes. When the phase of the auxiliary voltage differs 90 degrees from the phase of the voltage generated in the secondary motor winding on which said auxiliary voltage is impressed, preferably leading it by the amount stated, then the torque produced by the resulting current in co-operation with the primary revolving field is an alternating torque of double the slip frequency of the main motor or of double the frequency of the auxiliary voltage, its negative and positive maxima are equal and its amplitude is for otherwise equal conditions but about one half of that of the unidirectional torque which could be had by shifting the phase of the auxiliary voltage back through 90 degrees.

Now in Fig. 1 the brushes 10, 11 are coaxial with the secondary winding 14 to which they are connected and the voltage appearing at these brushes at sub-synchronous speeds, and generated in the winding 6 by its rotation relatively to the primary revolving flux of the motor, is either of same or of opposite phase with the voltage generated by the same flux in 14 according to the manner in which the brushes 10, 11 are connected to the terminals of the winding 14. In Fig. 1 and in the other figures, the connections are such that these voltages are cophasal. As regards the winding 15 to which the brushes 10, 11 are also connected the connections and the relation of the respective axes are such that the auxiliary voltage leads the voltage generated in the winding 15 by 90 degrees. This is readily recognized when it is remembered that the primary revolving flux revolves against the rotation of the primary. The circuit of the brushes 12, 13 is not conductively but inductively linked with that of the winding 16 and the position of these brushes on the winding 6 is so chosen that the voltage impressed on 16 by the transformer 41 and primarily derived from the brushes 12, 13 is substantially cophasal with the voltage generated in 16 near synchronism.

The synchronizing torque produced by 14 is substantially or even strictly unidirectional and pulsating, that produced by 15 is alternating and of double slip frequency. It is clear that the negative impulses of this torque can only be harmful to synchronization and are apt to cause hunting if allowed to assume sufficient proportions. From the synchronizing point of view the action of winding 15 is partly detrimental but this winding has a marked influence on the synchronous operation of the machine in that it helps to affect the value of the power factor with changing load or the compounding characteristic of the machine. This can be seen by reference to Fig. 4 or 5 and will be more fully explained later. The action of the winding 15 is also partly detrimental when the motor is operating sub-synchronously under loads in excess of the maximum synchronous load. I have found that the best starting, synchronizing and operating characteristics are obtained with or without the use of winding 16 when the number of turns of the winding 14 and the resistance of its circuit are so chosen that with the unidirectional voltage available in synchronous full load operation at the brushes 10, 11 the number of ampereturns produced by 14 is in excess of the ampereturns produced by the load reaction of the primary. Still better results are had when the ampereturns then produced by 14 are at least equal to the ampereturns simultaneously produced by the winding 15.

While the proportioning of the windings 14, 15 just set forth is of material assistance in securing a satisfactory performance from such motors, yet even better results can be had, particularly during the synchronizing and overload periods, by making certain use of the brushes 12, 13 and the winding 16.

The synchronizing torque produced by 16 when connected as just described and as shown in Fig. 1 is unidirectional and pulsating, as is that produced by 14, but phase displaced with respect to same. In combination with the latter it produces a more or less constant and unidirectional synchronizing torque. The more nearly equal the amplitudes of these two torques the more constant their resultant. Therefore when 16 is in use the final resultant torque is the combination of the two unidirectional torques due to 14 and 16 and of the double slip frequency alternating torque due to 15. It is clear that it is an easy matter to so dimension 16 and its circuits that the final resultant torque will have no negative values whatsoever. Under these conditions synchronization will be extremely powerful and rapid and will not cause any hunting even though the synchronizing torque is not constant. Furthermore, the normal asynchronous overload capacity will remain practically unimpaired and may even be increased.

But while the winding 16 materially adds to the sub-synchronous performance of the machine the windings 14, 15 are mostly sufficient to provide for the usually desired synchronous operating characteristic and I have therefore, as one form of my invention, conceived the idea of utilizing the more or less constant, or what may also be termed the polyphase, synchronizing torque due to 14 and 16 at speeds differing from the synchronous and rendering said torque, or one of the elements producing it, ineffective at synchronous speeds. I prefer to make the change automatically and in the embodiment shown in Fig. 1 I make use of the fact that the auxiliary voltages are always of slip frequency. Since the auxiliary voltages are always of slip frequency, their frequency diminishes as the motor approaches synchronism and they become unidirectional at synchronism, by coupling the winding 16 inductively instead of conductively with the brushes 12, 13 or more generally with the source of auxiliary voltage with which it co-operates to produce a synchronizing torque I make the winding 16 inoperative as soon as synchronism is reached since an inductive coupling of two circuits is not responsive to a unidirectional voltage. In Fig. 1 the transformer 41 inductively couples the circuit of the brushes 12, 13 with the circuit of the secondary winding 16 and when this winding is in use it helps to start the machine as an induction motor, contributes near synchronism and in conjunction with 14 to the production of a polyphase synchronizing torque but is quite ineffective at synchronous speed and does not contribute to the unidirectional magnetization of the secondary at synchronism. When the motor slips out of synchronism due to an overload or to some other cause, the winding 16 automatically resumes its activity and at least eliminates the disturbing negative torque produced by 15 at speeds differing from the synchronous.

In starting the motor of Fig. 1 when the differential and relay are not in use, the circuit of the brushes 12, 13 need not be closed until the speed begins to closely approach the synchronous and it is necessary to get the circuits in shape for synchronization. After synchronism has been reached the circuit of the brushes 12, 13 can be interrupted at 46, if it is not desired or necessary to have the help of 16 under overload conditions.

Under sub-synchronous overload conditions it is often most important to dispose of as nearly a constant synchronizing torque as feasible in order to make it possible for the motor to readily slip back into synchronism and to deal with its overload without severe and periodic variations in peripheral speed which are not only apt to produce disturbances and surges in the line, but considerably reduce the useful sub-synchronous overload capacity of the machines. This feature is of particular importance in large machines such as are usually provided with a separate exciter and I therefore prefer not to interrupt the circuit of the brushes 12, 13 after the motor has reached synchronism. This, of course, means that in Fig. 1 a certain amount of loss is occasioned by the unidirectional current which flows through this brush circuit. This loss is greatest at no load and diminishes with increasing load as will be further explained in connection with Fig. 4. When the circuit of these brushes is left closed after the motor has reached synchronism, then upon the occurrence of an overload sufficient to throw the motor out of synchronism the auxiliary voltages immediately become alternating and the inductive link with the winding 16 effective, thus instantaneously reestablishing the more or less constant polyphase synchronizing torque.

Under these conditions the circuit of the brushes 12, 13 should be designed with as much resistance as possible with a view to keeping the losses at synchronism down and the transformer 41 should be designed to be most effective at the very low periodicities at which the help of the winding 16 is particularly desired.

Because of the presence of the inductive link between the brushes 12, 13 and the winding 16 the phase of the voltage impressed on 16 by the transformer 41 may differ from the phase of the voltage at the brushes 12, 13. In order to take care of such a phase displacement the brushes may be displaced from the axis of 16, in which axis they should stand in the case of a conductive connection and the requirement that 16 produce an absolutely unidirectional synchronizing torque. But there is another reason why I prefer to sometimes displace the brushes 12, 13 from the axis of 16, in other words, why I prefer to make the phase of the auxiliary or brush voltage differ somewhat from the phase of the voltage generated in 16 at speeds near the synchronous. By displacing the brushes 12, 13 in the manner shown I can reduce the losses due to the idle unidirectional current flowing in the circuit of said brushes at synchronous speed as will be more fully explained later in connection with Fig. 4.

Particularly in the case of larger motors I can make use of the differential gear and relay shown in Fig. 1 in order to control the motor circuits with a view, among other things, of securing a higher efficiency in synchronous operation. At starting, the main motor is connected to the supply and the resistances in the secondary circuits 14, 15, 16 set to secure the desired starting torque. At such time the switch 51 is open, the circuit 36 of the relay open at 38 and the relay member 26 in the control of the spring 27. This means that the contacts 34, 35 are bridged, the resistance 37 shortcircuited and the bridge 31 out of contact with 29 and 30. The resistance 40 is dimensioned to sufficiently reduce the losses in its circuit in synchronous operation and will usually allow of 16 contributing to the induction motor torque, at least at starting. As the motor starts the resistances of the active secondary circuits can be diminished in the usual way to increase torque and speed. The shaft 22 of the differential being at rest, the rotor 25 will revolve counterclockwise, as seen from the main motor so long as said motor revolves counterclockwise. After a certain speed has been reached, switch 51 is closed, the motor 23 run up to synchronism and the circuit of 36 closed which excites the member 26 of the relay. As the auxiliary motor speeds up 25 slows down and as the speed of 23 exceeds the speed at which the main motor drives the shaft 20 the rotor 25 stops and reverses, now running clockwise. Because 26 is now excited a considerable torque, varying with speed, is developed between 25 and 26 and soon reaches a value which overpowers the spring 27 and causes the relay to break the direct connection between the contacts 34, 35 and bridge contacts 29, 30. This makes 16 fully effective and reduces the magnitude of the double slip frequency alternating torque produced by 15 to an extent dependent on the value of the resistance 37. Prompt synchronization results, whereupon the speed of shaft 20 equals that of shaft 22 and the rotor 25 comes to rest, relinquishing 26 to the control of the spring 27. This results in the bridging or shortcircuiting of the contacts 34, 35, thus restoring 15 to its full activity, and in removing the direct connection 31 from the contacts 29, 30 which reinserts resistance 40 into the circuit of the brushes 12, 13. Should the motor slip out of synchronism due to an overload or to some other cause and run at a speed below the synchronous, the rotor 25 is instantly set in motion in a clockwise direction, as seen from the main motor end, and the synchronizing connections instantly re-established by the relay. In this case the relay diminishes the negative torque produced by 15 directly by reducing the ampereturns in 15 and indirectly by rendering 16 fully effective and thus opposing whatever negative torque 15 still produces.

It is not necessary to use the resistances 37 and 40 in the circuits of 15 and 16; one or both of these circuits may be entirely interrupted when the contacts 34, 35 or 29, 30 are not bridged but the use of these resistances reduces the possibility of sparking at the relay contacts and they can usually be so proportioned as to be more helpful than otherwise.

Nor is it necessary to reduce the effectiveness of the winding 15 during the synchronizing period or upon the occurrence of overloads. Sufficiently good results will in most cases be secured by simply utilizing the relay to modify the effectiveness of the winding 16 and to reduce the losses in the circuit of the brushes 12, 13 at synchronism.

The operation of Fig. 2, in which the exciter circuit controlled by the brushes 12, 13 is in conductive relation to the winding 16, is practically the same except that entire reliance is placed on the relay for reducing or modifying the effectiveness of the winding 16 at synchronous speeds. When the relay is under the control of the spring 27, the carbon pile resistance 46 has its maximum value and this is so chosen that the winding 16 is then sufficiently ineffective and the losses in the circuit of the brushes 12, 13 reduced to a sufficiently low value at synchronism. Upon reduction of the motor speed below synchronism, the relay exerts a pressure on the carbon pile and reduces its resistance sufficiently to render 16 sufficiently effective, at the same time reducing the effectiveness of 15, or not as desired, by removing bridge 33 from contact with 34 and 35. It is clear that an ordinary adjustable resistance with a plurality of contacts can be used instead of the carbon pile.

In Fig. 3 the windings 14 and 15 are normally connected to the brush set 10, 11, the axis of which is coaxial with that of 14 and at right angles to that of 15. At sub-synchronous speeds this voltage is substantially of same phase as that generated in 14 and leads that generated in 15 by about 90 degrees. The movable relay member 52 is normally under the control of the spring 27 and bridges the contacts 34, 35, thus shortcircuiting the resistance 37 if used. The three phase windings 48 energized from the series transformers 43, 44, 45 produce a revolving field which co-operates with 52 to counteract the spring 27 and when the current taken by the motor reaches a certain value they take control of the movable member 52, interrupt the short-circuit between the contacts 34, 35 and shortcircuit contacts 29, 30, thus shortcircuiting the resistance 40, if used, and connecting the winding 15 to the brush set 11, 13 the axis of which coincides with that of 15 and which collect a voltage from the exciter which is substantially in phase with that generated in 15 by the primary revolving flux.

The motor of Fig. 3 is started by setting the resistances 39, 42 and 46 to secure the desired starting torque. If the relay is set to overpower the spring 27 at or about the current corresponding to the maximum synchronous load and the starting current does not exceed this current, then the motor will start with the windings 14, 15 doing duty as secondaries of an induction motor, synchronize with the help of these same windings, particularly if dimensioned as set forth in connection with Fig. 1, and continue to run synchronously with these windings connected to the brushes 10, 11 until, under overload, that current is reached for which the relay is set. At such time the winding 15 will be thrown over to the brushes 11, 13 while 14 remains connected to 10, 11. When the motor drops out of synchronism, the current instantly increases by a considerable percentage and this rapid change can, if desired, be utilized to secure a snappy action of the switch blade 31. All that is necessary is to adjust same to overpower the spring 27 with a current slightly in excess of that corresponding to the sychronous load.

As long as the windings 14, 15 are both connected to the brushes 10, 11, the winding 14 will produce a strictly unidirectional and pulsating torque and the winding 15 a double slip frequency alternating torque. If these two windings are proportioned as specified in connection with Fig. 1, the resultant synchronizing torque will be substantially unidirectional. When 15 is connected to the brushes 11, 13 a polyphase synchronizing torque results which can be made as constant as desired by suitably adjusting the ampereturns in the windings 14 and 15. Upon the occurrence of an overload in normal operation or when the motor is to be started or synchronized under very heavy load requiring a larger current than that for which the automatic switch is set, the winding 15 will be connected to the brushes 11, 13 to produce a polyphase synchronizing torque. In order to avoid hunting of the automatic switch, care should be taken to so set the resistance 46 that the torque produced when 15 is connected to 11, 13 is not so great as to immediately throw the motor back into synchronism; on the other hand, the resultant torque should be as uniform as possible so as to reduce as far as possible every interference with the asynchronous overload capacity of the motor. To this end the resistance in the circuits of 14 can be increased when 15 is connected to the brushes 11, 13 instead of the brushes 11, 10.

In dimensioning the rotor and stator of the relay shown in Figs. 1 and 2, the torque curve of torque plotted against speed for constant excitation of the winding 36 can be made to vary within wide limits by changing the form and size of the poles and the resistance of the squirrel cage or other short-circuited winding on the rotor. This torque may be made to rise abruptly with increasing speed, reach a maximum at very low rotor speeds and then gradually diminish, or the rise to the maximum can be much more gradual as is, I think, well understood. Since this torque is required over a very short range of speeds, corresponding to the maximum slip of the main motor operating as an induction motor under more than normal load, a steeply rising curve will usually be best suited to the requirements for it gives the quickest response upon departure of the main motor from synchronism. This torque can also be modified by varying the excitation of 26. The rotor 52 of the relay in Fig. 3 is designed to give the desired torque at line frequency.

Some of the features of this invention will perhaps be better understood by reference to Figs. 4 and 5. In Fig. 4 let it be supposed that the rotor, here the primary, revolves counterclockwise, that 16 is omitted and the magnetizations produced by the windings 14 and 15 are in the direction of the small arrows placed alongside these windings. Further let the resultant of the magnetizations due to 14 and 15 be F as to position and direction. This magnetization F is the secondary flux of the machine and may have a number of components, for instance the magnetizations produced by the windings 14, 15 or 16. The pole S is shown riding the arrow F to more clearly indicate the pole of the unidirectional magnetization produced by the secondary. This magnetization may and does change with load in so far as its magnitude is concerned, but its direction and space position remain constant as long as synchronism is preserved and winding 16 is not in use. The resultant magnetization R of the motor, however, changes its space position and to some extent also its magnitude as the load varies. One component of R is F, the other is the armature or primary load reaction. When the primary revolves, the secondary unidirectional magnetization, the primary armature reaction and the resultant R are all stationary in space except when the load changes, at such time synchronism is momentarily departed from and the armature reaction and the resultant R change their position or magnitude or both. When the primary is at rest and the secondary revolves, as is usually the case in the larger and the separately excited motors, then the secondary unidirectional magnetization, the armature reaction and the resultant magnetization R all revolve synchronously and change their relative space positions with changing load by momentarily departing from synchronous rotation. At light loads the resultant motor magnetization may be R' and can be made to nearly coincide with F, for a heavier load this resultant may be R'' and will be further removed from F, for a still higher load it may be located as R''' is with reference to F.

The only magnetization which affects the magnitude of the auxiliary or brush voltage is the resultant magnetization R. Disregarding the winding 16 for the moment and remembering that in order to get a high output for weight and a considerable overload capacity with acceptable power factor values at the motor terminals it is necessary for the auxiliary voltage, which here is taken from the brushes 10, 11, to rise with rising load, it is clear that it is, in this respect, of advantage to have F lie close to the axis of 14 and R lie close to F at no load; for instance in the position of R'. Under these circumstances, the resultant R can travel through a considerable angle, as well seen in Fig. 4, before it comes to stand at right angles to the axis of the brushes 10, 11, at which time the maximum auxiliary voltage will be reached, and R can even travel well beyond that position before a marked diminution occurs in this auxiliary voltage. Which all means that the overload capacity of the machine will be great. But the power factor regulation or compounding and the magnitude and configuration of the synchronizing torque are not necessarily satisfactory under these conditions. It is simple enough to locate the axis of F close to that of 14.

This is achieved by suitably selecting the ratio of the ampereturns in the two windings 14 and 15 but nothing in particular is gained thereby unless the dimensioning of the windings 14 and 15 permits of securing an F of suitable magnitude for synchronizing, and provides for R falling close to F at no-load and at the beginning of an arc $a$ which is so located with reference to the brushes 10, 11 as to secure a variation of the auxiliary voltage which will give a practically acceptable compounding characteristic when R travels through this arc with increasing load. These all important results can only be achieved when the number of turns in the windings 14 and 15 and the resistance of their circuits are so chosen that the ampereturns produced in 14, with the auxiliary voltage available at full load, are in excess of the ampereturns set up by the primary or armature reaction at full load and preferably also greatly in excess of the ampereturns simultaneously produced by the winding 15. A ratio of the ampereturns in 14 to those in 15 as high as 2 and even 3 to 1 gives very good results. The auxiliary voltage is at all times proportional to sine $c$ which measures the angular displacement between R and the brush axis.

It is further seen that as the load increases the voltage at the brushes 12, 13 decreases. If the winding 16 is used together with the windings 14, 15 and left in circuit after synchronism has been reached, its effect will first diminish but may later increase with increasing load. It will increase with increasing load if R travels past the axis of the brushes 12, 13, for instance as R''' has done. So long as the resultant R lies somewhere between the brushes 11 and 12, the ampereturns in 16 will oppose those in 15 and reduce the power factor of the motor. When R coincides with the axis of the brushes 12, 13 the winding 16 will be quite inactive and when the axis of R moves past 12 in a direction against the rotation of the primary, the ampereturns in 16 will begin to assist those in 15. The result of all this will be that F will travel to some extent against rotation of the primary as the load increases. For this reason 16 should be used cautiously at synchronism. If 16 is not required to boost or modify the shape of the synchronizing torque to a very marked extent it can usually be left in circuit at synchronism. At synchronism the winding 16 can successfully be used, for instance, as a means of modifying the compounding characteristic. To this end the resistance of its circuit must sometimes be increased at synchronism as is automatically done in Fig. 2. As a further means to this end I may move the brushes 12, 13 either backward or forward. If I move them forward or in the direction of rotation of the primary as shown in Figs. 1 and 2, then the maximum voltage available at the brushes 12, 13 at synchronism will be reduced but without at all decreasing the magnitude and, if the displacement is moderate, without very materially changing the phase of this auxiliary voltage at sub-synchronous speeds when the winding 16 is to perform its primary function of increasing the magnitude or improving the configuration of the synchronizing torque and thus improving synchronization and reducing the interference with the asynchronous overload capacity of the motor. Such a displacement of the brushes is also beneficial in Fig. 1 for the reason that it decreases the useless losses in the circuit of the brushes 12, 13 at synchronous operation of the motor. Just where the brushes should stand in order to secure the minimum loss depends on the average load of the motor. The axis of the brushes 12, 13 should for minimum average losses about coincide with the axis of R under average load conditions of the motor. The compounding characteristic is also influenced by the position of these brushes 12, 13. If these brushes are displaced from coincidence with the axis of 15 in the direction of rotation of the primary, then the winding 16 will begin by opposing the winding 15. As R travels against rotation this opposition will decrease and 16 will finally help 15. If these brushes are displaced in the opposite direction then R may not travel far enough to ever reverse the ampereturns in 16 and a different compounding characteristic will result.

Fig. 5 differs from Fig. 4 in that the windings 14 and 15 are combined into a single winding 50. In so far as operation at synchronous speed is concerned, the machines are similar and in order to get the best results the winding 50 must be so dimensioned that with the auxiliary voltage available at full load that component of the ampereturns it produces which coincides with the axis of the brushes 10, 11 is at least equal to the ampereturns set up by the primary armature reaction at full load and preferably also in excess of that component of its total ampereturns which is perpendicular to the axis of the brushes 10, 11.

It is to be understood that a synchronous motor is a machine capable of operating at a constant and synchronous speed under varying load conditions and which does so operate. The synchronous motors described in this specification carry unidirectional ampereturns F on their secondary and unless the organization of the machine is such as to permit, with changing torque demand, (1) of an angular displacement between the axis of F and the axis of the resultant motor magnetization R, or (2) of a change in the magnitude of F, or (3) of said angular displacement and of said change in magnitude, the motor cannot and does not run at a constant and synchronous speed under varying load conditions.

It is further to be understood that by "synchronous torque" is meant a torque exerted by a synchronous motor when in normal operation and therefore when running synchronously under load. By "synchronizing torque" is meant any torque adapted to or capable of bringing up to synchronism a motor capable of operating synchronously under varying load conditions. It is, for instance, known that an ordinary polyphase induction motor is a non-synchronous machine the torque of which falls off very rapidly as synchronism is approached and actually becomes zero at synchronism. It is also known that a polyphase induction motor can be so modified as to make it capable of operating synchronously under varying load conditions. Any torque which, in a polyphase induction motor adapted to operate synchronously under varying load, will bridge the gap between the induction motor torque of the machine, which becomes zero at synchronism, and its synchronous torque is referred to as a "synchronizing torque."

A synchronous motor is said to be "compounded" when the unidirectional ampere-turns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these "compounding characteristics" are popular and right now the last named is probably more in demand.

Synchronous motors embodying the characteristic structural features of the asynchronous induction motors, such as absence of defined polar projections on stator and rotor, distributed windings and short air-gaps, are sometimes referred to as "synchronous-induction motors" because of their ability to operate synchronously over one range of loads and non-synchronously over another range of loads.

Any displacement of the axis of a set of commutator brushes from the axis of the secondary winding to which they are connected causes the synchronizing torque to deviate from strict unidirectionality and to become alternating. For a displacement of 90 electrical degrees this torque is an alternating torque of double slip frequency with equal positive and negative maxima. For a displacement of 45 electrical degrees a negative maximum is only about 18 per cent of a positive maximum and the latter last three times as long as the former. Furthermore the positive maximum is only about 18 per cent less than the positive maximum available when the synchronizing torque is strictly unidirectional. For a displacement of 45 degrees, the amplitude of the unidirectional synchronizing torque component is theoretically double that of the double frequency alternating component and as long as the amplitude of the double frequency component does not materially exceed half the amplitude of the unidirectional component the resultant synchronizing torque can be considered as substantially unidirectional. Similarly when the resultant synchronizing torque is due to more than one winding on the secondary connected to one or to more than one set of cooperating commutator brushes, or, generally, to a plurality of auxiliary voltages, then said torque can be considered substantially unidirectional so long as the amplitude of its double frequency component does not materially exceed half the amplitude of its unidirectional component.

Since very little power is required to operate the relay 25, 26, it will be understood that the differential gear and the gear wheels 18, 19 and 24 can be very small and this is also true of the auxiliary synchronous motor 23. Noiseless rawhide or fiber gearing can very well be used for this purpose and need not occupy more than a very restricted space.

It is immaterial whether the primary or the secondary is designed to revolve, but it is to be noted that when the secondary revolves instead of the primary, brush displacements and other adjustments referred to direction of rotation of the revolving member are to be made in the opposite direction. For example, a brush displacement in the direction of rotation when the primary revolves is equivalent to a brush displacement against the direction of rotation when the revolving member is the secondary.

It is also useful to note that while a displacement of the brushes with rotation when the primary revolves is equivalent to a displacement of the brushes against rotation when the secondary revolves, yet in both cases the brushes are displaced against the direction of rotation of the revolving field produced by the primary.

A brush displacement against rotation of the primary or in the direction of rotation of the secondary is in either case a brush displacement in the direction of rotation of the primary revolving flux.

It is also to be understood that the invention is equally applicable to separately excited synchronous induction motors excited from frequency converters and the like, broadly from a source supplying one or more voltages which are of slip frequency at sub-synchronous speeds and become unidirectional at synchronism of the motor to which they are applied.

In order to make full use of the properties of the improved motor I prefer to design both members without defined polar projections, using a short air-gap and well distributed windings as is usual in good induction motor practice. In that way good starting, powerful and smooth synchronizing and high weight efficiency can be secured.

The reason for showing the commuted winding 6 as separate from the three-phase winding 5 is to indicate that as a rule these two windings must be designed for very different voltages. In order to secure good commutation and avoid dangerously high voltages in the windings 14, 15 and 16 and 50 at starting, it is necessary to make the maximum brush voltage much smaller than even the lowest usual distribution voltage applied to 5. There are various known modifications of such windings and these may be used instead of the arrangement shown in the figures without modifying the mode of operation of my improved motor.

While theories have been advanced in connection with the machines referred to herein, this has been done with a view to facilitating their description and understanding but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

The subject matter disclosed in connection with Figs. 2, 4 and 5 is specifically claimed in application Serial Number 126,685 filed by me August 2, 1926.

Having thus described the invention, what is claimed is:

1. The method of operating a motor which carries variable load at synchronous speed, comprising, producing a primary flux which revolves with respect to the primary, generating an auxiliary voltage which near synchronism is of slip frequency and is unidirectional at synchronism, impressing the auxiliary voltage below synchronism on a secondary circuit to produce a substantially unidirectional synchronizing torque in cooperation with the primary flux and at synchronism a part of the secondary unidirectional magnetization, and impressing the same auxiliary voltage at synchronism on another secondary circuit to produce another and displaced part of the secondary unidirectional magnetization.

2. The method of operating a motor which carries variable load at synchronous speed, comprising, producing a primary flux which revolves with respect to the primary, generating auxiliary voltages which are of slip frequency and differ in phase near synchronism and become unidirectional at synchronism, impressing the auxiliary voltages on secondary circuits to produce near synchronism and in cooperation with the primary flux a continuous synchronizing torque, and at synchronism rendering one of the auxiliary voltages ineffective with respect to the secondary.

3. The method of operating a motor which carries variable load at synchronous speed, comprising, producing a primary flux which revolves with respect to the primary, generating auxiliary voltages which are of slip frequency and differ in phase near synchronism and become unidirectional at synchronism, impressing one auxiliary voltage on a secondary circuit to produce in cooperation with the primary flux a substantially unidirectional synchronizing torque and at synchronism a part of the secondary unidirectional magnetization, impressing another auxiliary voltage on another and displaced secondary circuit to produce in cooperation with the primary flux a substantially unidirectional synchronizing torque differing in phase from the first substantially unidirectional synchronizing torque, and at synchronism impressing the first auxiliary voltage on a secondary circuit to produce another part of the secondary unidirectional magnetization.

4. The method of operating a motor which carries variable load at synchronous speed, comprising, producing a primary flux which revolves with respect to the primary, generating auxiliary voltages which are slip frequency and differ in phase near synchronism and become unidirectional at synchronism, impressing one auxiliary voltage on a secondary circuit to produce in cooperation with the primary flux a substantially unidirectional synchronizing torque and at synchronism a part of the secondary unidirectional magnetization, impressing another auxiliary voltage on another secondary circuit to produce a substantially unidirectional synchronizing torque differing in phase from the first substantially unidirectional synchronizing torque, thereafter decreasing the ampereturns of the secondary circuit which produced the second substantially unidirectional synchronizing torque, and impressing the first auxiliary voltage on a secondary circuit to produce another part of the secondary unidirectional magnetization.

5. The method of operating a motor which carries variable load at synchronous speed, comprising, generating auxiliary voltages which are of slip frequency and differ in phase near synchronism and become unidirectional at synchronism, impressing one auxiliary voltage on a secondary winding conductively, and impressing another auxiliary voltage on another secondary winding inductively.

6. A motor which carries variable load at synchronous speed, having a primary member carrying a winding adapted to produce a primary flux which revolves with respect to the primary, a secondary member having windings in inductive relation to said primary winding and positioned to produce displaced magnetizations, means adapted to make available phase displaced voltages which are of slip frequency near synchronism and unidirectional at synchronism, and means for impressing one of said auxiliary voltages on said secondary to produce a magnetization along one axis at subsynchronous speeds and for impressing the other of said voltages on said secondary to produce a magnetization along the same axis at synchronism.

7. A motor which carries variable load at synchronous speed, having a primary member carrying a winding adapted to produce a primary flux which revolves with respect to the primary, a secondary member having windings in inductive relation to said primary winding, means adapted to make available a voltage which is of slip frequency near synchronism and unidirectional at synchronism, means for impressing said voltage on one of said secondary windings, and means for impressing said voltage on another secondary winding only at synchronism.

8. A motor which carries variable load at synchronous speed, having a primary member carrying a winding adapted to produce a primary flux which revolves with respect to the primary, a secondary member having windings in inductive relation to said primary winding, means adapted to make available phase displaced voltages which are of slip frequency near synchronism and unidirectional at synchronism, means for impressing one of said voltages on one of said secondary windings, and means for impressing the other of said voltages on another secondary winding only at speeds below the synchronous.

9. A motor which carries variable load at synchronous speed, having a primary member carrying a winding adapted to produce a primary flux which revolves with respect to the primary, a secondary member having windings in inductive relation to said primary winding, a source adapted to deliver a current which is of slip frequency below synchronism and unidirectional at synchronism, and means for connecting said source conductively with one of said secondary windings and inductively with another secondary winding.

10. A motor which carries variable load at synchronous speed, having a primary member carrying a winding adapted to produce a primary flux which revolves with respect to the primary, a secondary member having windings in inductive relation to said primary winding, means adapted to make available phase displaced voltages which are of slip frequency near synchronism and unidirectional at synchronism, means for impressing one of said voltages conductively on one of said secondary windings, and means for impressing the other of said voltages inductively on another secondary winding.

11. A motor which carries variable load at synchronous speed, having a primary and a secondary, said primary being adapted for connection to an alternating current supply, a commuted winding on the primary, brushes co-operating with said commuted winding, means located on the secondary and connected to the brushes for producing a unidirectional magnetization at an angle to the perpendicular to the brush axis, said means producing at full load ampereturns in the brush axis which are in excess of the ampereturns concurrently produced by the primary or armature reaction of the motor.

12. A motor which carries variable load at synchronous speed, having a primary and a secondary, said primary being adapted for connection to an alternating current supply, a commuted winding on the primary, brushes co-operating with said commuted winding, means located on the secondary and connected to the brushes for producing a unidirectional magnetization at an angle to the perpendicular to the brush axis, said means producing at full load ampereturns in the brush axis which are in excess of the ampereturns concurrently produced by the primary or armature reaction of the motor and also in excess of the ampereturns concurrently produced in the axis perpendicular to the brush axis.

13. A motor which carries variable load at synchronous speed, having a primary and a secondary, means for impressing on the secondary voltages which are of slip frequency at speeds differing from the synchronous and become unidirectional at synchronous speed, and means for automatically rendering one of said voltages ineffective at synchronism.

14. A motor which carries variable load at synchronous speed, having a primary and a secondary, a source of current adapted to supply to said secondary voltages which are of slip frequency and of different phase at motor speeds differing from the synchronous and become unidirectional when the motor runs synchronously, and means dependent on the motor load for modifying one secondary circuit including said source of current relatively to another such secondary circuit.

15. A motor which carries variable load at synchronous speed, having a primary and a secondary, a source of current adapted to supply to said secondary voltages which are of slip frequency and of different phase at motor speeds differing from the synchronous and become unidirectional when the motor runs synchronously, and means irresponsive to synchronous but responsive to other speeds for modifying one secondary circuit including said source of current relatively to another such secondary circuit.

16. A motor which carries variable load at synchronous speed, having a primary and a secondary, a source of current adapted to supply to said secondary voltages which are of slip frequency and of different phase at motor speeds differing from the synchronous and become unidirectional when the motor runs synchronously, and means responsive to loads in excess of the maximum synchronous load for modifying one secondary circuit including said source of current relatively to another such secondary circuit.

17. In combination with a motor which carries variable load at synchronous speed, a relay or switch for controlling the circuits of the motor, said switch being responsive to a difference between the speed of the said motor and the speed of an auxiliary synchronous motor.

18. A motor which carries variable load at synchronous speed, having a primary and a secondary, displaced windings on the secondary, a source of current adapted to supply voltages which are of slip frequency and of different phase at motor speeds differing from the synchronous and become unidirectional when the motor runs synchronously, means for conductively conveying one of said voltages to one of the displaced windings on the secondary, and means for inductively conveying another of said voltages to another of said windings.

19. A motor which carries variable load at synchronous speed, having a primary and a secondary, two coaxial windings and a displaced winding on the secondary, a source of current adapted to supply voltages which are of slip frequency and displaced in phase at motor speeds differing from the synchronous and become unidirectional when the motor runs synchronously, conductive means for impressing one of said voltages on one of the coaxial windings and on the displaced winding on the secondary, and means including a transformer for impressing another of said voltages on the other coaxial winding.

20. A motor which carries variable load at synchronous speed, having a primary and a secondary, a source of current adapted to supply a voltage which is of slip frequency at motor speeds differing from the synchronous and becomes unidirectional when the motor runs synchronously, and means for inductively conveying the voltage from the source to the secondary.

21. A motor which carries variable load at synchronous speed, having means for producing two substantially unidirectional but periodically varying synchronizing torques the maxima of which are displaced in time, and means responsive to asynchronous but not to synchronous speeds for rendering one of them ineffective at synchronous speeds.

22. A motor which carries variable load at synchronous speed, having a primary and a secondary, said primary being adapted for connection to an alternating current supply, three windings on the secondary two of which are coaxial and the third displaced 90 electrical degrees from the coaxial ones, a commuted winding on the primary, two sets of brushes co-operating with the commuted winding, the first set of brushes being coaxial with the displaced winding and connected to it and to one of the coaxial windings to produce a secondary magnetization displaced from the perpendicular to this first set of brushes, and the second set being displaced from the first and connected to the other coaxial winding to produce a secondary magnetization approximately coinciding with the perpendicular to said first set of brushes.

23. A motor which carries variable load at synchronous speed, having a primary and a secondary, said primary being adapted for connection to an alternating current supply, a source of current connected to the secondary and adapted to produce a positive torque at synchronism and a torque of varying polarity at other speeds, and means for eliminating all negative torques when the motor slips out of synchronism upon the occurrence of an overload.

24. A motor which carries variable load at synchronous speed, having a primary and a secondary, said primary being adapted for connection to an alternating current supply, means for producing a substantially unidirectional torque and a double slip frequency torque and means for substituting a second substantially unidirectional torque for the double slip frequency torque when synchronizing the motor.

In testimony whereof I affix my signature this 21st day of March, 1924.

VALÈRE ALFRED FYNN.

DISCLAIMER.

1,599,758.—*Valère Alfred Fynn*, St. Louis, Mo. SYNCHRONOUS MOTOR. Patent dated September 14, 1926. Disclaimer filed February 16, 1929, by the patentee.

Hereby enters this disclaimer to that part of said patent constituting claims 11 and 12 thereof, which claims are in the following words, to wit:

"11. A motor which carries variable load at synchronous speed, having a primary and a secondary, said primary being adapted for connection to an alternating current supply, a commuted winding on the primary, brushes cooperating with said commuted winding, means located on the secondary and connected to the brushes for producing a unidirectional magnetization at an angle to the perpendicular to the brush axis, said means producing at full load ampereturns in the brush axis which are in excess of the ampereturns concurrently produced by the primary or armature reaction of the motor.

"12. A motor which carries variable load at synchronous speed, having a primary and a secondary, said primary being adapted for connection to an alternating current supply, a commuted winding on the primary, brushes cooperating with said commuted winding, means located on the secondary and connected to the brushes for producing a unidirectional magnetization at an angle to the perpendicular to the brush axis, said means producing at full load ampereturns in the brush axis which are in excess of the ampereturns concurrently produced by the primary or armature reaction of the motor and also in excess of the ampereturns concurrently produced in the axis perpendicular to the brush axis."

[*Official Gazette March 5, 1929.*]